United States Patent

Miyamori et al.

[11] Patent Number: 5,677,994
[45] Date of Patent: Oct. 14, 1997

[54] HIGH-EFFICIENCY ENCODING METHOD AND APPARATUS AND HIGH-EFFICIENCY DECODING METHOD AND APPARATUS

[75] Inventors: Shinji Miyamori; Masatoshi Ueno, both of Tokyo, Japan

[73] Assignees: Sony Corporation, Tokyo, Japan; Sony Cinema Products Corporation, Culver City, Calif.

[21] Appl. No.: 420,734

[22] Filed: Apr. 11, 1995

[30] Foreign Application Priority Data

Apr. 15, 1994 [JP] Japan .................................. 6-076966

[51] Int. Cl.⁶ .................................................. H04B 14/04
[52] U.S. Cl. .......................... 395/2.92; 395/2.95; 375/243
[58] Field of Search ................................ 395/2.09, 2.13, 395/2.91, 2.21, 2.92, 2.94, 2.95; 381/29, 30, 34, 35; 375/243

[56] References Cited

U.S. PATENT DOCUMENTS 5,491,481  2/1996  Akagiri ................................ 395/2.21
5,548,574  8/1996  Shimoyoshi et al. ............... 395/1.13
5,563,913  10/1996  Akagiri et al. ....................... 375/243

FOREIGN PATENT DOCUMENTS

0 540 329    5/1993  European Pat. Off. .
WO 92/12607 7/1992  WIPO .
WO 92/12608 7/1992  WIPO .
WO 94/01980 1/1994  WIPO .

Primary Examiner—Benedict V. Safourek
Assistant Examiner—Ricky Ngo
Attorney, Agent, or Firm—William S. Frommer; Alvin Sinderbrand

[57] ABSTRACT

A high-efficiency encoding method and apparatus assuring a higher data compression ratio than with known encoding method and apparatus. The multi-channel signals including bandwidth-limited signals of at least one channel are encoded by the same encoding technique by an encoding unit. The bandwidth-limited signals of at least one channel, resulting from encoding by the encoding unit, are re-encoded by a re-encoding unit for eliminating the redundant information produced by the bandwidth limitation.

8 Claims, 8 Drawing Sheets

HIGH-EFFICIENCY ENCODING METHOD AND APPARATUS AND HIGH-EFFICIENCY DECODING METHOD AND APPARATUS

BACKGROUND OF THE INVENTION

Thus invention relates to a high-efficiency encoding and decoding method and apparatus in encoding and decoding multi-channel data. More particularly, it relates to a high-efficiency encoding and decoding method and apparatus in encoding and decoding multi-channel data, inclusive of bandwidth-limited data, such as data for use exclusively in the low-frequency range, known as the sub-woofer channel audio data, among multi-channel audio data employed in a multi-sound audio systems, such as motion picture film projection systems, video tape recorders or video disc players.

There are a variety of techniques for high-efficiency encoding of audio data or speech signals, such as transform coding belonging to the blocking frequency spectrum dividing system, or a sub-band coding belonging to the non-blocking frequency spectrum dividing system.

In the transform coding, digital audio data on the time domain is divided into time blocks, each of which is transformed into data on the frequency axis by orthogonal transform, and the resulting data on the frequency axis is further divided into plural frequency ranges for encoding from one frequency range to another. In sub-band coding, digital audio data on the time axis is divided into plural frequency ranges for encoding without dividing the time-domain digital audio data into time blocks.

In a combination of sub-band coding and transform coding, digital signals representing the audio signals are divided into a plurality of frequency ranges by sub-band coding, and transform coding is independently applied to each of the frequency ranges.

Among known filters for dividing a frequency spectrum into a plurality of frequency ranges is the quadrature mirror filter (QMF), as discussed in, for example, R. E. Crochiere, Digital Coding of Speech in Sub-bands, 55 BELL SYST. TECH. J., No. 8 (1976). The technique of dividing a frequency spectrum into equal-width frequency ranges is discussed in Joseph Rothweiler, Polyphase Quadrature Filters- A New Sub-band Coding Technique, ICASSP 83 BOSTON.

Among known techniques for orthogonal transform is the technique of dividing the digital input audio signal into frames of a predetermined time duration, and processing the resulting frames using a Fast Fourier Transform (FFT), discrete cosine transform (DCT) or modified DCT (MDCT) to convert the signals from the time axis into the frequency axis. Discussion of a MDCT may be found in J. P. Princen and A. B. Bradley, Sub-band/Transform Coding Using Filter Bank Based on Time Domain Aliasing Cancellation, ICASSP 1987.

In a technique of quantizing the spectral coefficients resulting from an orthogonal transform, it is known to use sub bands that take advantage of the psychoacoustic characteristics of the human auditory system. In this, spectral coefficients representing an audio signal on the frequency axis may be divided into a plurality of critical frequency bands. The widths of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from MDCT, the spectral coefficient data generated by the MDCT within each of the critical bands is quantizod using an adaptively allocated number of bits. Among known adaptive bit allocation techniques is that described in IEEE TRANS. ON ACOUSTICS, SPEECH AND SIGNAL PROCESSING, VOL. ASSP-25, No. 4 (1977 august) in which bit allocation is carried out on the basis of the amplitude of the signal in each critical band. In the bit allocation technique described in M. A. Krassner, The Critical Band Encoder-Digital Encoding of the Perpetual Requirements of the Auditory System, ICASSP 1980, the psychoacoustic masking mechanism is used to determine a fixed bit allocation that produces the necessary signa-to-noise ratio for each critical band.

With the high-efficiency audio data compression coding system, employing the above-mentioned sub-band coding, the system of compressing the audio data to approximately ⅕ by taking advantage of the psychoacoustic characteristics of the human auditory system, referred to herein as ⅕ compression system, is being put to practical utilization.

With the motion picture film projection system, stereo sound systems for high definition television, video tape recorders or video disc players or the multi-sound audio system, to say nothing of the usual audio system, the tendency is towards using audio data or speech signals of plural channels, such as 4 to 8 channels. In such cases, it has been desired to effect high efficiency coding with bit rate reduction.

Figure 1:
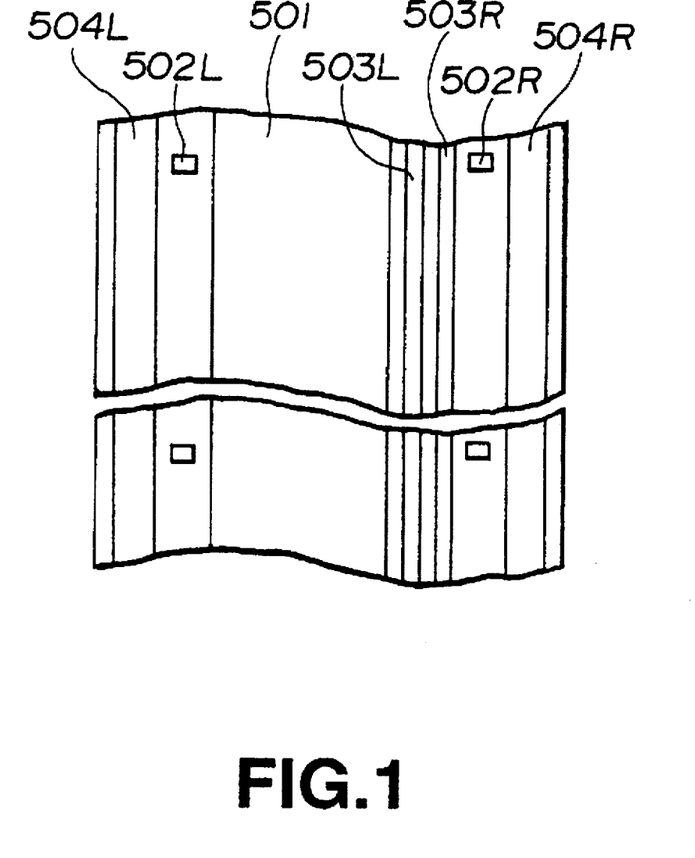
FIG. 1 shows an arrangement of a high efficiency encoding apparatus embodying the present invention.

For example, a motion picture film has a picture recording area 501 for recording the picture to be projected, perforation 502L, 502R for transporting the motion picture film, analog sound tracks 503L, 50BE for enabling audio signal reproduction with conventional equipment, and digital sound tracks 504L, 504R for recording multi-channel digital audio data, as shown in FIG. 1.

When recording audio data of eight channels, that is a left channel, a left center channel, a center channel, a right center channel, a right channel, a surround left channel, a surround right channel and a sub-woofer channel, on a digital sound track 504L and a digital sound track 504R, high efficiency coding of reducing the bit rate is required.

That is, it is difficult to procure on the motion picture film a recording area for recording the 8-channel audio data for a digital audio disc produced by sampling at a sampling frequency of 44.1 kHz and linear quantization of 18-bits per sample. Thus it becomes necessary to compress the audio data.

Figure 2:
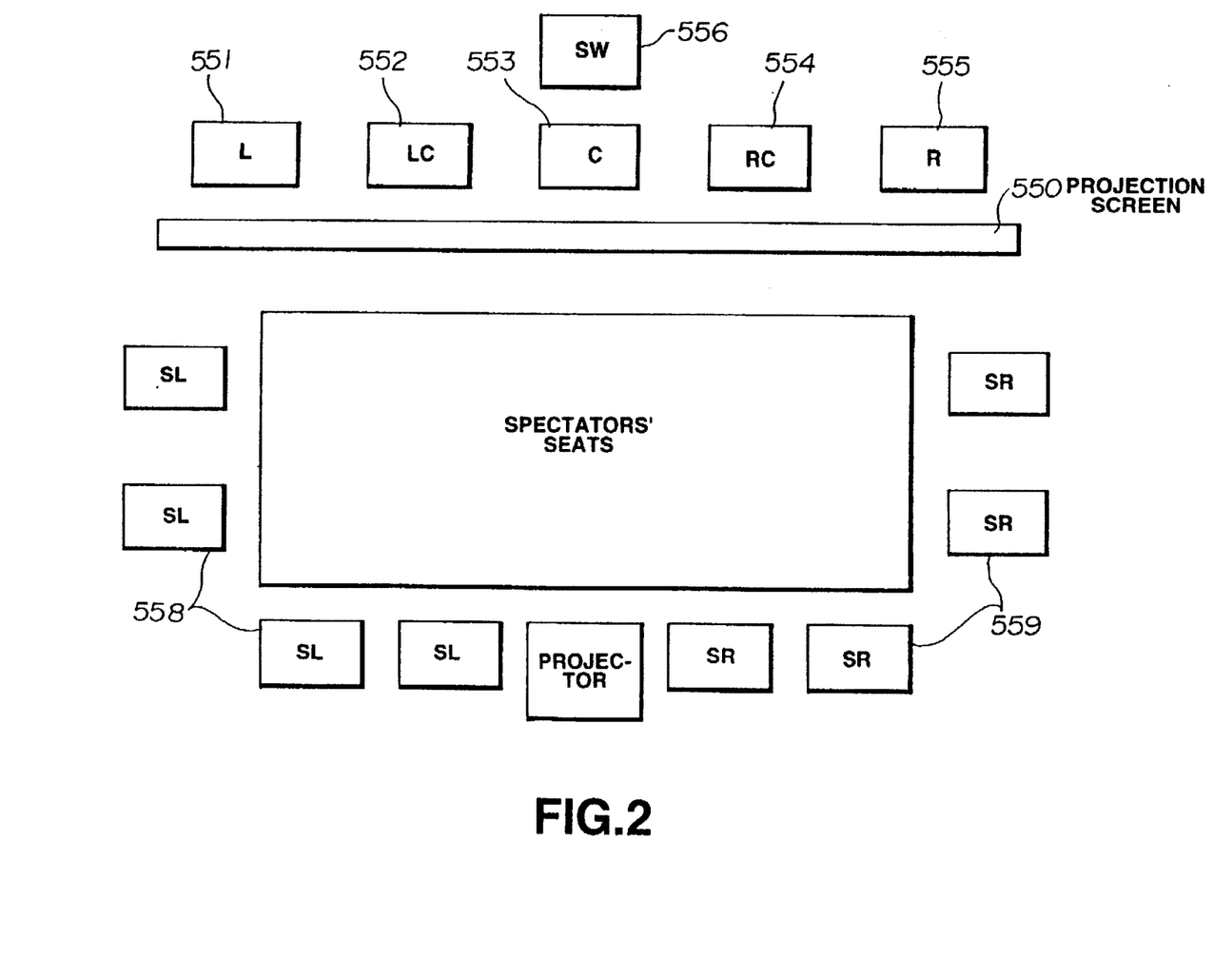
FIG. 2 shows an arrangement of encoding means of the high efficiency encoding apparatus shown in FIG. 1.

Meanwhile, the eight channels recorded on the motion picture film are associated with a left speaker 551, a left center speaker 552, a center speaker 553, a right center speaker 554, a right speaker 555, a sub-woofer speaker 556, a surround left speaker 558 and a surround right speaker 559, as shown in FIG. 2. The former six speakers are arranged on the side of a screen 550 on which a picture reproduced by a picture recording area of the motion picture film is projected by a projector, while the latter two are arranged for surrounding the spectator's seats.

The center speaker 553 is arranged at a mid portion of the side of a screen 550 and outputs a playback sound by the audio data of the center channel. Thus it outputs the crucial playback sound, such as the actor's or actresses' dialogue.

The sub-woofer channel 556 outputs the playback sound by the audio data of the sub-woofer channel. Thus it outputs the sound which is perceived as vibrations such as the detonating sound rather than as the sound of the low frequency range. Thus it is frequently used for a scene of detonation with utmost effects. The upper limit of the sub-woofer channel frequency is generally said to be 80 to 200 Hz.

The left speaker 551 and the right speaker 555 are arranged on the left and right sides of the screen 550 and exhibit stereo sound effect by outputting the playback sound by the left channel audio data and the right channel audio data.

The left center speaker 552 is arranged between the left speaker 551 and the center speaker 553, while the right center speaker 554 is arranged between the center speaker 553 and the right speaker 555. The left center speaker 552 outputting the audio data by the left center channel and the right center speaker 554 outputting the audio data by the right center channel play the role of assistant speakers for the left speaker 551 and the right speaker 555, respectively. In a motion picture theater having a large-sized screen 550 and capable of holding a large number of spectators, the fixed sound image position feeling tends to become labile with the positions of the seats. Addition of the left center speaker 552 and the right center speaker 554 is effective to create a more realistic fixed position feeling of the sound image.

The surround left speaker 558 and the surround right speaker 559 are arranged for surrounding the spectator's seats and output the playback sound by the audio data of the surround left channel and the playback sound by the audio data of the surround right channel. These speakers are effective in producing the reverberating sound and the impression of being encircled by hand clapping and jubilee, thus creating a more stereophonic sound image.

Since the film as a recording medium is susceptible to surface scratches, it cannot be used because of data dropout if the audio data is directly recorded thereon. For this reason, the error correction capability of the error correction code becomes crucial such that data compression needs be carried out insofar as the data can be recorded on the recording area on the film along with the error correction code.

In view of the foregoing, the above-mentioned ⅕ compression system is adopted as the method for compressing the 8-channel digital audio data. That is, if an optimum number of bits is allocated by taking the human psychoacoustic characteristics into account, a high efficiency encoding system may be realized for achieving the sound quality comparable to that of the digital audio disc, even although the digital audio data such as are recorded on a digital audio disc, that is such digital audio data produced by sampling at the sapling frequency of 44.1 kHz followed by quantization at a rate of 16 bits per sample, is compressed to approximately one/fifth.

If, with the above-mentioned high-efficiency encoding system exploiting the ⅕ compression system, the bandwidth limited data, such as the low-range data which is known as sub-woofer and which is employed for effectively expressing the sound, is encoded, there is produced redundant information because the sub-woofer data is the bandwidth-limited data. For this reason, if there are plural channels, it is desirable to eliminate the redundant information for procuring the recording area for achieving data compression with higher efficiency.

However, the format of the high efficiency is already established and the hardware exploiting the format is also put on the market. Thus the elimination of the redundant information and any change or expansion of the format for achieving data compression with a higher efficiency will impose considerable man power on the part of the manufacturer. On the other hand, since the high efficiency encoding device exploiting the above format is commercialized, such change or expansion means considerable inconvenience to the user of the marketed equipment. For this reason, attempts are being made for achieving data compression of higher efficiency by artifices used in the coding and decoding operations without changing or extending the format.

For example, there have already been proposed methods of employing a high-efficiency encoding system for use exclusively by data of the bandwidth-limited channel or encoding data of the bandwidth-limited channel after superimposing the data on data of another channel and subsequently separating the latter data by a filter during decoding.

However, with the high-efficiency encoding system for use exclusively by data of the bandwidth-limited channel, the data of the bandwidth-limited channel encoded by the high efficiency encoding system and the data of the other channel encoded by the ⅕ compression encoding system are difficult to synchronize with each other during reproduction because of the difference in the frame length or the time duration per frame. On the other hand, since the format of the high-efficiency encoding system for use exclusively by data of the bandwidth-limited channel is different from that of the ⅕ compression encoding system, it is extremely difficult to use data of these different formats simultaneously.

On the other hand, if, with the method of encoding data of the bandwidth-limited channel after superimposing the data on data of another channel and subsequently separating the latter data by a filter during decoding, the bandwidth-limited data is the low frequency data, low frequency range components necessarily contained in the data of the other channel tend to be lost if the other channel data is separated by the filter during reproduction.

SUMMARY OF THE INVENTION

In view of the foregoing, it is a principal object of the present invention to provide a method and apparatus for high efficiency encoding whereby data of plural channels including at least one channel of bandwidth-limited data may be processed with encoding with a higher efficiency.

It is another object of the present invention to provide a method and apparatus for high efficiency decoding whereby data encoded by the high efficiency encoding method and apparatus may be decoded with high efficiency by a simplified decoding arrangement.

According to the present invention, there is provided a high-efficiency encoding method for encoding multi-channel signals including bandwidth-limited signals of at least one-channel, including encoding the multi-channel signals by the same encoding technique and eliminating, from the encoded bandwidth-limited signals of at least one-channel, the redundant information resulting from bandwidth limitation by re-encoding.

With the high-efficiency encoding method of the present invention, the multi-channel signals inclusive of bandwidth-limited signals of at least one channel are encoded by the same encoding technique. The encoded bandwidth-limited signals of at least one channel are freed of the redundant information produced by bandwidth limitation. This enables the multi-channel data including at least one channel of the bandwidth-limited data to be encoded with higher encoding efficiency.

DESCRIPTION OF THE PREFERRED EMBODIMENTS

Referring to the drawings, preferred embodiments of the present invention will be explained in detail.

Figure 3:
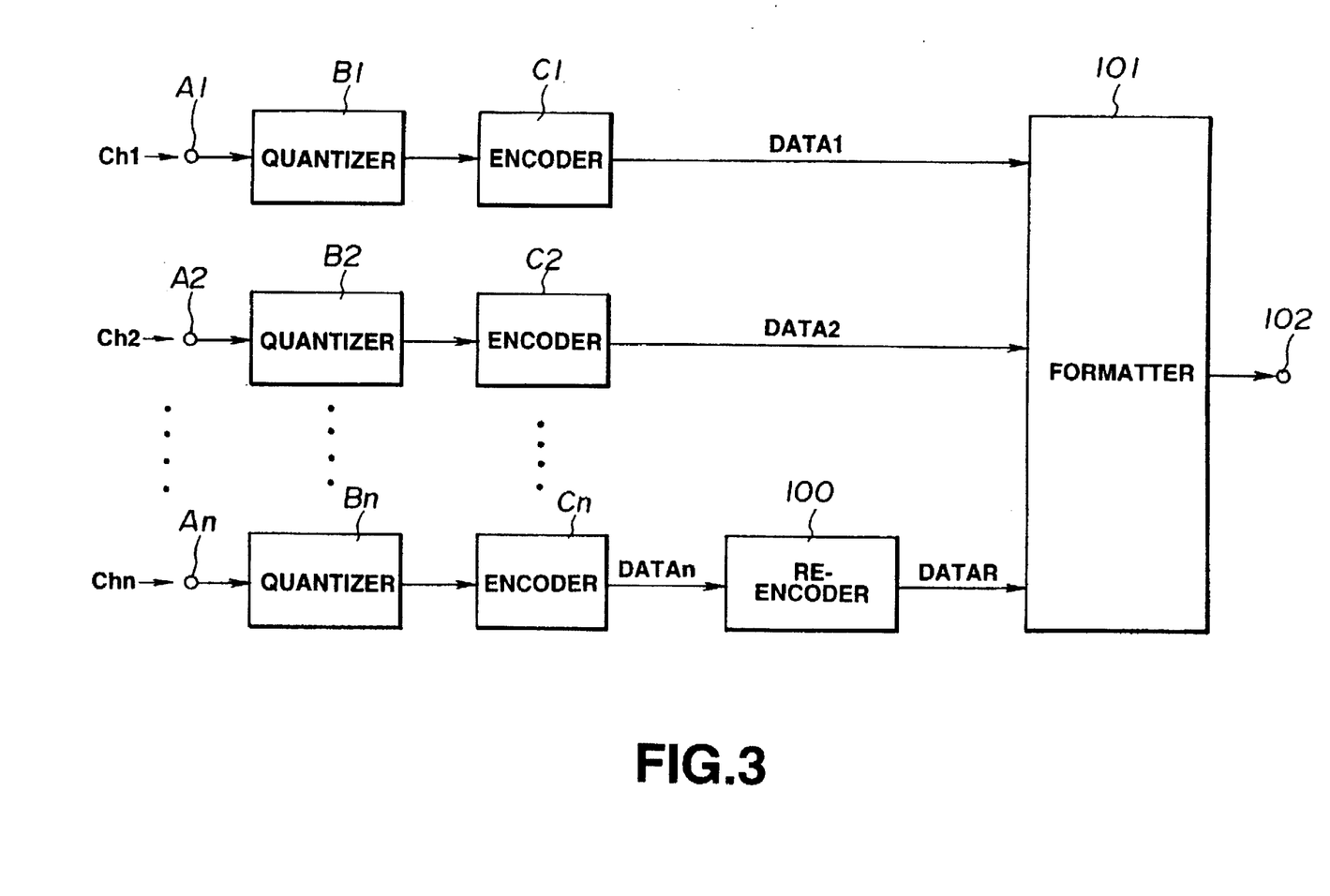
FIG. 3 illustrates the manner of allocation of encoded data in a sound frame.

The high efficiency encoding method according to the present invention is carried out by a high efficiency encoding apparatus shown in FIG. 3.

In the high efficiency encoding apparatus, exploiting the ⅕ compression system, audio signals of plural channels Ch1 to Chn, inclusive of the bandwidth-limited audio signals Chn, enter input terminals A1 to An, respectively, as shown in FIG. 3. The plural channel audio signals Ch1 to Chn, entering the input terminals A1 to An, are quantized by quantizers B1 to Bn, respectively. The plural channel audio signals Ch1 to Chn, quantized by the quantizers B1 to Bn, are encoded by the same means by encoders C1 to Cn, respectively. The bandwidth-limited audio data Chn, encoded by the encoder Cn, is freed of the redundant information generated by bandwidth limitation by a re-encoder 100. The audio data C1 to C(n−1), encoded by the encoders C1 to C(n−1), and the bandwidth-limited and re-encoded audio data Chn from the re-encoder 100, are built into a bitstream in accordance with a pre-set format by a formatter 101. The data thus built into the bitstream by the formatter 101 are outputted at an output terminal 102.

Of the audio signals Ch1 to Chn, the audio signals Chn represent bandwidth-limited signals, such as signals of the above-mentioned sub-woofer channel having the upper limit frequency of 200 Hz.

The input terminals A1 to An, quantizers B1 to Bn and the encoders C1 to Cn are associated with the respective channels of the audio signals Ch1 to Chn entering the present high efficiency encoding apparatus, and are adapted for processing the audio signals of the associated channels.

The quantizers B1 to Bn are designed to sample and quantize the plural channel audio signals Ch1 to Chn entering the input terminals A1 to An, respectively, for converting the audio signals Ch1 to Chn into audio data Ch1 to Chn, respectively.

The encoders C1 to Cn are explained in detail. The encoders C1 to Cn are of the same constitution and are designed for encoding the plural channel audio data Ch1 to Chn, sampled and quantized by the quantizers B1 to Bn, and outputting the resulting encoded audio data Ch1 to Chn as encoded or compressed data Data1 to Datan.

Figure 4:
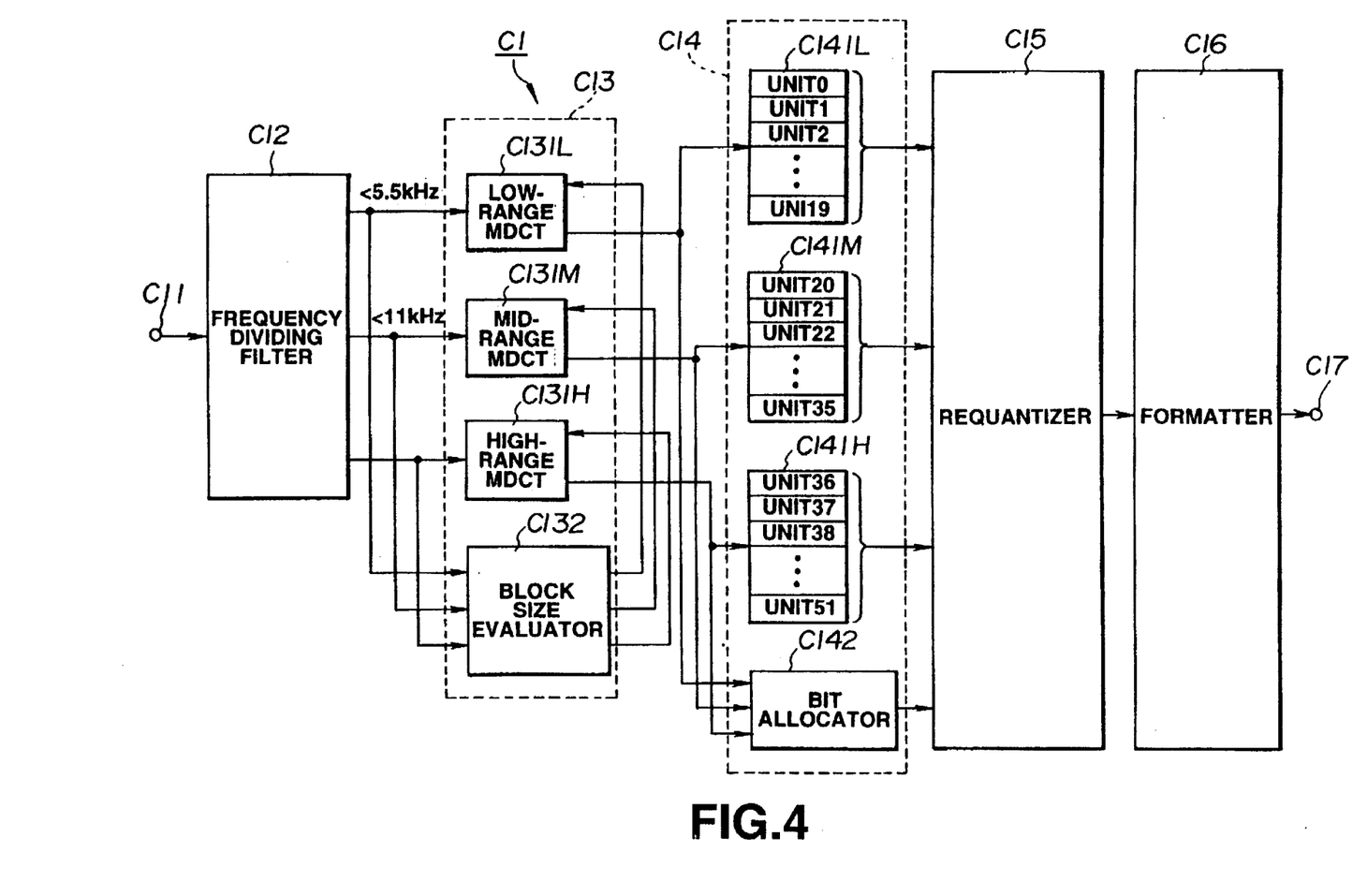
FIG. 4 illustrates the manner of allocation of encoded data in a re-compressed sound frame.

The encoder C1 has an input terminal C11 the audio data Ch1 of the first channel enters from the quantizer B1, as shown in FIG. 4. A frequency dividing filter C12 divides the frequency of the audio data Ch1 entering the input terminal C11 into three frequency bands. A MDCT unit C13 processes the audio data divided by the frequency dividing filter C12 into three frequency bands with MDCT for resolution into signal components on two-dimensional areas of time and frequency, that is, signal components on a block floating unit. A block floating unit processor C14 normalizes the audio data of the respective frequency bands resulting from resolution into the signal components on the block floating unit by the MDCT unit C13. A re-quantizer C15 re-quantizes the audio data, normalized by the unit processor C14, on the block floating unit basis, while finding the parameter information for encoding. A formatter C16 builds the parameter information on the block floating unit basis from the re-quantizer C15 and the re-quantized spectrum data into a bitstream in accordance with a pre-set format. An output terminal C17 outputs the data built into the bitstream by the formatter C18 as compressed data Data1.

The frequency dividing filter C12 divides the frequency of the first channel audio data Ch1 entering the input terminal C11 into three frequency bands, namely a low range band of from 0 to 5.5 kHz, a mid range band of from 5.5 kHz to 11 kHz and a high-range band of from 11 kHz to 22 kHz.

The MDCT unit C13 includes a low-range MDCT circuit C131L for processing the low frequency range audio data resulting from frequency division by the frequency dividing filter C12 with MDCT, and a mid-range MDCT circuit C131M for processing the mid frequency range audio data resulting from frequency division by the frequency dividing filter C12 with MDCT. The MCT unit also includes a high-range MDCT circuit C131H for processing the high frequency range audio data resulting from frequency division by the frequency dividing filter C12 with MDCT. Finally, the MDCT unit C13 includes a block size evaluator C132 for determining the time block length for MDCT processing of the audio data of the respective frequency ranges by the low-range MDCT circuit C131L, mid-range MDCT circuit C131M and the high-range MDCT unit C131H.

The block size evaluator C132 determines the time block length for MDCT processing for each frequency band so that the time block length will become shorter and longer for an acutely changing portion of the audio data and for a steady-state portion of the audio data for each frequency band, respectively. The information indicating the determined time block length is fed to each of the low-range MDCT circuit C131L, mid-range MDCT circuit C131M and to the high-range MDCT unit C131H. This improves the time resolution in the acutely changing portions of the audio data, while controlling the quantization noise and the effective transmission of signal components in the steady-state portion of the audio data.

The longer time block is termed the long mode and corresponds to a time length of 11.6 msec. The shorter time block is termed the short mode and corresponds to up to 1.45 ms for the high range (11 to 22 kHz) and to up to 2.9 ms and 2.9 ms for thee mid range (5 to 11 kHz) and the low range (0 to 5.5 kHz) for correspondingly raising the time resolution.

The above-described MDCT unit C13 executes MDCT processing on the audio data from the frequency dividing filter C12 divided into respective frequency bands while controlling the time block length for resolving the above audio data into signal components on the time and frequency block floating units.

The block floating unit processor C14 is made up of a low-range normalizing circuit C141L, a mid-range normalizing circuit C141M, a high-range normalizing circuit C141H and a bit allocator C142. The low-range normalizing circuit C141L divides the low frequency range audio data, resolved by the MDCT unit C13 into signal components on the block floating units, into respective time/frequency block floating units, and normalizes the data from one time/frequency block floating unit to another, using suitable scaling factors. The mid-range normalizing circuit C141M divides the mid frequency range audio data, resolved by the MDCT unit C13 into signal components on the time/frequency block floating units, into respective block floating units, and normalizes the data from one time/frequency block floating unit to another, using suitable scaling factors. The high-range normalizing circuit C141H divides the high frequency range audio data, resolved by the MDCT unit C13 into signal components on the tome/frequency block floating units, into respective time/frequency block floating units, and normalizes the data from one time/frequency block floating unit to another, using suitable scaling factors. The bit allocator C142 analyzes of which components the audio data supplied from the MDCT unit C13 to the low-range normalizing circuit C141L, mid-range normalizing circuit C141M and the high-range normalizing circuit C141H are constituted.

The low-range normalizing circuit C141L divides the low-range audio data supplied thereto into 20 units. Similarly, the mid-range normalizing circuit C141M divides the mid-range audio data supplied thereto into 16 units and the high-range normalizing circuit C141H divides the high-range audio data supplied thereto into 16 units. Thus the audio data from the low range up to the high range is divided into a sum total of 52 blocks.

The bit allocator C142 analyzes, by taking advantage of the psychoacoustic characteristics of the human auditory mechanism, from which components the audio data supplied to the block floating unit processor C14 are constituted. That is, the block floating unit processor C14 outputs the audio data of the respective frequency ranges divided into the respective block floating units and the results of analyses of the audio data.

The re-quantizer C15 finds, based on the results of analyses from the block floating unit processor C14, with which accuracy the block floating units of the audio data normalized for the respective units of the low range, mid range and the high range from the processor C14, are to be encoded, that is the information concerning the encoding parameters, and re-quantizes the audio data.

When finding the information concerning the encoding parameters, the re-quantizer C15 executes bit allocation based on the block size mode, the quantity of the subsidiary information and the scaling factors for determining the word length.

The formatter C16 combines the re-quantized spectral data and the information of the encoding parameters, as found by the re-quantizer C15 from one block floating unit to another, in accordance with a pre-set format, for transmission or recording on a recording medium, and outputs the resulting combined data.

The operation of the above-described encoder C1 is hereinafter explained.

The frequency dividing filter C12 divides the Ch1 audio data, entering the input terminal C11, into three frequency ranges, namely a low frequency range, a mid frequency range and a high frequency range, and routes the audio data in the three frequency ranges to the MDCT unit C13.

The low-range audio data, mid-range audio data and the high-range audio data, supplied from the frequency dividing filter C12 to the MDCT unit C13, are supplied to the low-range MDCT circuit C131L, mid-range MDCT circuit C131M and the high-range MDCT unit C131H, respectively. In addition, the low-range audio data, mid-range audio data and the high-range audio data are also fed to the block size evaluator C132.

The low-range MDCT circuit C131L performs MDCT processing on the low-range audio data from the frequency divider C12, using the time block length for the MDCT from the block size evaluator C132.

The mid-range MDCT circuit C131M performs MDCT processing on the mid-range audio data from the frequency divider C12, using the time block length for the MDCT from the block size evaluator C132.

The high-range MDCT circuit C131H performs MDCT processing on the high-range audio data from the frequency divider C12, using the time block length for the MDCT from the block size evaluator C132.

The respective audio data, resolved by the low-range normalizing circuit C141L, mid-range normalizing circuit C141M and the high-range normalizing circuit C141H into signal components on the time and frequency units, for the respective frequency bands, are routed to the block floating unit processor C14.

The low-range audio data, mid-range audio data and the high-range audio data from the MDCT unit C13, resolved into respective signal components on the time/frequency block floating units, are respectively routed to the low-range normalizing circuit C141L, mid-range normalizing circuit C141M and to the high-range normalizing circuit C141H. In addition, the low-range audio data, mid-range audio data and the high-range audio data are also fed to the bit allocator C142.

The low-range normalizing circuit C141L resolves the low-range audio data from the MDCT unit C13, resolved into signal components on the block floating units, into 20 block floating units, while normalizing the block floating units, using suitable scaling factors, from one block floating unit to another, and outputs the normalized audio data to the re-quantizer C15.

The mid-range normalizing circuit C141M resolves the mid-range audio data from the MDCT unit C13, resolved into signal components on the block floating units, into 16 block floating units, while normalizing the block floating units, using suitable scaling factors, from one block floating unit to another, and outputs the normalized audio data to the re-quantizer C15.

The high-range normalizing circuit C141H resolves the high-range audio data from the MDCT unit C13, resolved into signal components on the block floating units, into 16 block floating units, while normalizing the block floating units, using suitable scaling factors, from one block floating unit to another, and outputs the normalized audio data to the re-quantizer C15.

The bit allocator C142 analyzes of what components the audio data of the low frequency range, mid frequency range and the high frequency range from the MDCT unit C13 resolved into the signal components on the block floating units are constituted, and transmits the results of analyses to the re-quantizer C15.

The re-quantizer C15 finds the parameter information, from one block floating unit to another, based on the results of analyses from the block floating unit processor C14, and re-quantizes the low range, mid range and high range audio data from the processor C14, normalized from one block floating unit to another. The re-quantizer C15 routes the parameter information and the re-quantized spectral data to a formatter C16 from one block floating unit to another.

The formatter C16 builds the parameter information and the re-quantized spectral data from the re-quantizer C15 in accordance with the predetermined format from one block floating unit to another and outputs the data thus built into a bitstream at an output terminal C17 as encoded data Data1.

The encoders C2 to Cn execute the same processing on the audio data Ch2 to Chn of the associated channels as that executed by the encoder C1, whereby the encoded data Data2 to Datan are respectively outputted by the encoders C2 to Cn.

The operation by the encoders C1 to Cn is executed for each unit termed a sound frame which is made up of 212 bytes. Each sound frame is made up of encoded audio playback data corresponding to 512 samples or one channel, with the sampling rate being 44.1 kHz.

The data in the sound frame is now explained.

Figure 5:
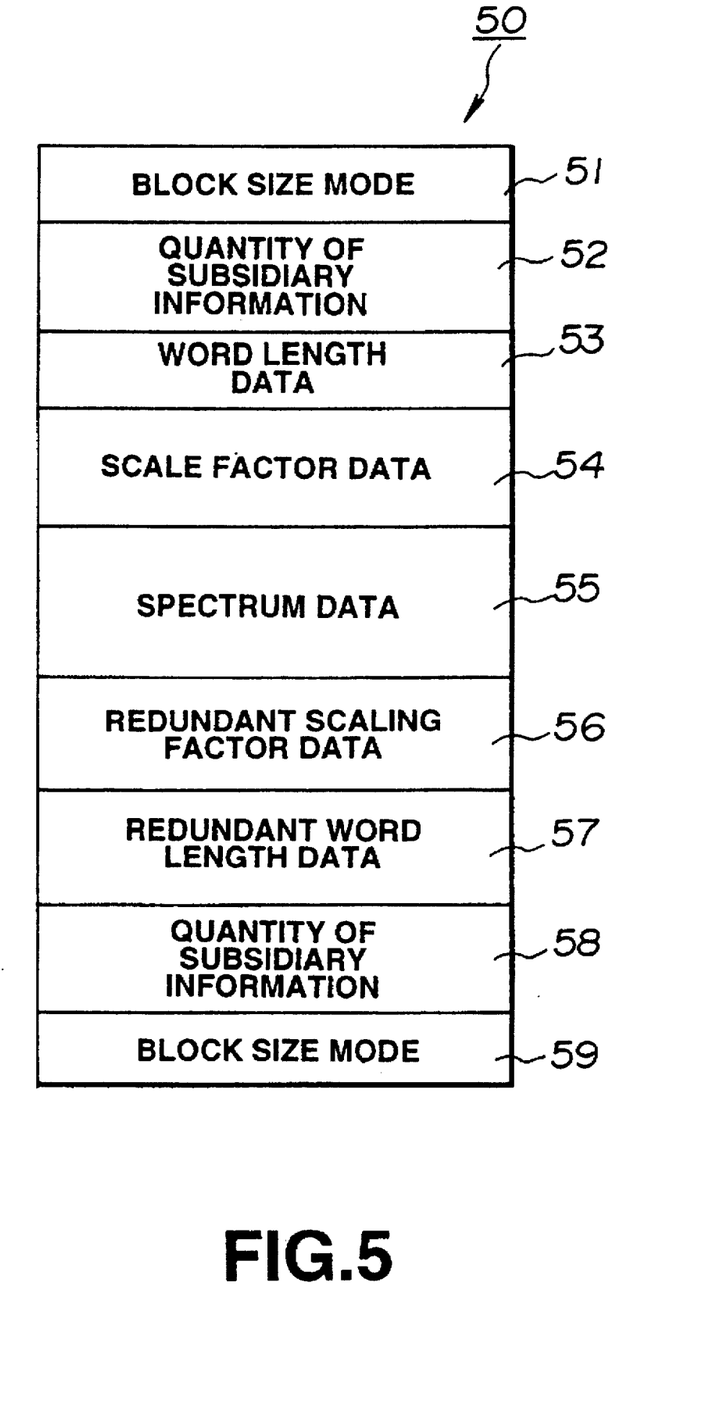
FIG. 5 shows an arrangement of a high efficiency decoding apparatus embodying the present invention.

The sound frame has a data format comprised of a block size mode recording area 51, a sample information quantity recording area 52, a word length data recording area 53, a scaling factor data recording area 54, a spectrum data recording area 55, a redundant scaling factor data recording area 56, a redundant word length data recording area 57, a lower subsidiary information quantity recording area 58 and a lower block size mode recording area 59, as shown in FIG. 5.

The redundant scaling factor data recording area 56, redundant word length data recording area 57, lower subsidiary information quantity recording area 58 and the lower block size mode recording area 59 are written in duplicates for assuring error correction.

The block size mode recording area 51 is an area for recording the results of evaluation by the block size evaluator C132 of the MDCT unit C13. Referring to Table 1, the audio data of the low and mid frequency ranges for the long mode are divided by the low-range MDCT unit 131L and the mid-range MDCT unit 131M into 128 spectral components, while the audio data of the high frequency range for the long mode is divided by the high-range MDCT unit 131H into 256 frequency components. The audio data of the low, mid and high frequency ranges for the short mode are divided by the low-range MDCT unit 131L, mid-range MDCT unit 131M and the high-range MDCT unit 131H into 32 spectral components.

TABLE 1

| Frequency Band | Code | Mode | Number of Frequency Components |
| --- | --- | --- | --- |
| High | 00 | Short | 32 |
|  | 01 | Long | 256 |
| Mid | 00 | Short | 32 |
|  | 01 | Long | 128 |
| Low | 00 | Short | 32 |
|  | 01 | Long | 128 |

The subsidiary information quantity recording area 52 is an area for recording the three information data, that is amounts 1, 2 and 3 shown in Table 2. The amount 1 denotes the number of the word length data and the scaling factor data recorded in the word length data recording area 53 and the scaling factor data recording area 54, while the amounts 2 and 3 denote the numbers of the word length data and the scaling factor data recorded in duplicates in the word length data recording area 53 and the scaling factor data recording area 54, respectively.

TABLE 2

| Amount 1 | | Amount 2 | | Amount 3 | |
| --- | --- | --- | --- | --- | --- |
| Code | Number | Code | Number | Code | Number |
| 000 | 20 | 00 | 0 | 000 | 0 |
| 001 | 28 | 01 | 28 | 001 | 8 |
| 010 | 32 | 10 | 44 | 010 | 12 |
| 011 | 36 | 11 | 52 | 011 | 16 |
| 100 | 40 | | | 100 | 24 |
| 101 | 44 | | | 101 | 36 |
| 110 | 48 | | | 110 | 44 |
| 111 | 52 | | | 111 | 52 |

The word length recording area 53 is an area for recording the word length on re-quantization of the respective block floating units

TABLE 3

| Code | Word Length(in bits) | Code | Word Length(in bits) |
| --- | --- | --- | --- |
| 0000 | 0 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 | as shown in Table 3.

The scaling factor recording area 54 is an area for recording normalized values of the respective block floating units, as shown in Tables 4 and 5.

TABLE 4

| Codes SF[n] bit pattern | Values Scale Factor Value |
| --- | --- |
| 000000 | $0.99999999 \times 2^{-5}$ |
| 000001 | $0.62996052 \times 2^{-4}$ |
| 000010 | $0.79370052 \times 2^{-4}$ |
| 000011 | $0.99999999 \times 2^{-4}$ |
| 000100 | $0.62996052 \times 2^{-3}$ |
| 000101 | $0.79370052 \times 2^{-3}$ |
| 000110 | $0.99999999 \times 2^{-3}$ |
| 000111 | $0.62996052 \times 2^{-2}$ |
| 001000 | $0.79370052 \times 2^{-2}$ |
| 001001 | $0.99999999 \times 2^{-2}$ |
| 001010 | $0.62996052 \times 2^{-1}$ |
| 001011 | $0.79370052 \times 2^{-1}$ |
| 001100 | $0.99999999 \times 2^{-1}$ |
| 001101 | $0.62996052 \times 2^{0}$ |
| 001110 | $0.79370052 \times 2^{0}$ |
| 001111 | $0.99999999 \times 2^{0}$ |
| 010000 | $0.62996052 \times 2^{1}$ |
| 010001 | $0.79370052 \times 2^{1}$ |
| 010010 | $0.99999999 \times 2^{1}$ |
| 010011 | $0.62996052 \times 2^{2}$ |
| 010100 | $0.79370052 \times 2^{2}$ |
| 010101 | $0.99999999 \times 2^{2}$ |
| 010110 | $0.62996052 \times 2^{3}$ |
| 010111 | $0.79370052 \times 2^{3}$ |
| 011000 | $0.99999999 \times 2^{3}$ |
| 011001 | $0.62996052 \times 2^{4}$ |
| 011010 | $0.79370052 \times 2^{4}$ |
| 011011 | $0.99999999 \times 2^{4}$ |
| 011100 | $0.62996052 \times 2^{5}$ |
| 011101 | $0.79370052 \times 2^{5}$ |
| 011110 | $0.99999999 \times 2^{5}$ |
| 011111 | $0.62996052 \times 2^{6}$ |

TABLE 4-continued

| Codes SF[n] bit pattern | Values Scale Factor Value |
|---|---|
| 100000 | $0.79370052 \times 2^6$ |
| 100001 | $0.99999999 \times 2^6$ |
| 100010 | $0.62996052 \times 2^7$ |
| 100011 | $0.79370052 \times 2^7$ |
| 100100 | $0.99999999 \times 2^7$ |
| 100101 | $0.62996052 \times 2^8$ |
| 100110 | $0.79370052 \times 2^8$ |
| 100111 | $0.99999999 \times 2^8$ |
| 101000 | $0.62996052 \times 2^9$ |
| 101001 | $0.79370052 \times 2^9$ |
| 101010 | $0.99999999 \times 2^9$ |
| 101011 | $0.62996052 \times 2^{10}$ |

TABLE 5

| Codes SF[n] bit pattern | Values Scale Factor Value |
|---|---|
| 101100 | $0.79370052 \times 2^{10}$ |
| 101101 | $0.99999999 \times 2^{10}$ |
| 101110 | $0.62996052 \times 2^{11}$ |
| 101111 | $0.79370052 \times 2^{11}$ |
| 110000 | $0.99999999 \times 2^{11}$ |
| 110001 | $0.62996052 \times 2^{12}$ |
| 110010 | $0.79370052 \times 2^{12}$ |
| 110011 | $0.99999999 \times 2^{12}$ |
| 110100 | $0.62996052 \times 2^{13}$ |
| 110101 | $0.79370052 \times 2^{13}$ |
| 110110 | $0.99999999 \times 2^{13}$ |
| 110111 | $0.62996052 \times 2^{14}$ |
| 111000 | $0.79370052 \times 2^{14}$ |
| 111001 | $0.99999999 \times 2^{14}$ |
| 111010 | $0.62996052 \times 2^{15}$ |
| 111011 | $0.79370052 \times 2^{15}$ |
| 111100 | $0.99999999 \times 2^{15}$ |
| 111101 | $0.62996052 \times 2^{16}$ |
| 111110 | $0.79370052 \times 2^{16}$ |
| 111111 | $0.99999999 \times 2^{16}$ |

The amount 1 of the subsidiary information quantity recording area 52 shown in Table 2 denotes the number of block floating units recorded in the word length data recording area 53 and in the scaling factor data recording area 54. For example, if the code denoted by the amount 1 is "000", the number of the block floating units recorded in the word length data recording area 53 and in the scaling factor data recording area 54 is equal to 20. That is, the first block floating unit 0 to the 20th block floating unit 19 of the low-range normalizing circuit C141L shown in FIG. 4 are recorded in the word length data recording area 53 and in the scaling factor data recording area 54. This corresponds to 5.5 kHz in terms of the frequency.

On the other hand, since the smallest number of the units denoted by the amount 1 is 20, the input data can be bandwidth limited with the ⅕ compression system to data up to 5.5 kHz. Conversely, bandwidth limitation at a frequency lower than 5.5 kHz is impossible with the ⅕ compression system.

In the case of the bandwidth-limited data with the upper limit of the frequency of 200 Hz, such as the bandwidth-limited audio data Chn, the bit allocator C142 determines the amount-1 code to "000" because there is no frequency component not lower than 200 Hz in the bandwidth-limited audio data Chn.

Thus the data to be recorded in the word length data recording area 53 and in the scaling factor data recording area 54, that is the word-length data and the scaling factor data, are 20 units with the frequency up to 5.5 kHz.

For recording data up to the frequency of 200 Hz, it suffices to record the first unit UNIT0 and to record the first unit UNIT0 up to the fourth unit UNIT3 for the long mode and the short mode, respectively.

Consequently, of the 20 units recorded in the word length data recording area 53 and in the scaling factor data recording area 54, the scaling factor and the word length of the 19 units, namely the second unit UNIT1 to the 20th unit UNIT19, represent redundant information for the lone mode, while the scaling factor and the word length of the 16 units, namely the fifth unit UNIT4 to the 20th unit UNIT19, represent redundant information for the short mode.

That is, when the bandwidth-limited audio data Chn is encoded by the encoder Cn as described above, the redundant information is produced by the bandwidth limitation. The bandwidth-limited audio data Chn, carrying the redundant information by encoding, that is the encoded data Datan, is freed in the encoding unit of the redundant information at the re-encoder 100.

The re-encoder 100 is now explained.

The encoder Cn routes only the encoded data Datan of the long mode to the re-encoder 100.

The re-encoder 100 eliminates the redundant information from the encoded data Datan, generated in the encoder Cn in accordance with the format of the data 50 in the sound frame shown in FIG. 5.

Figure 6:
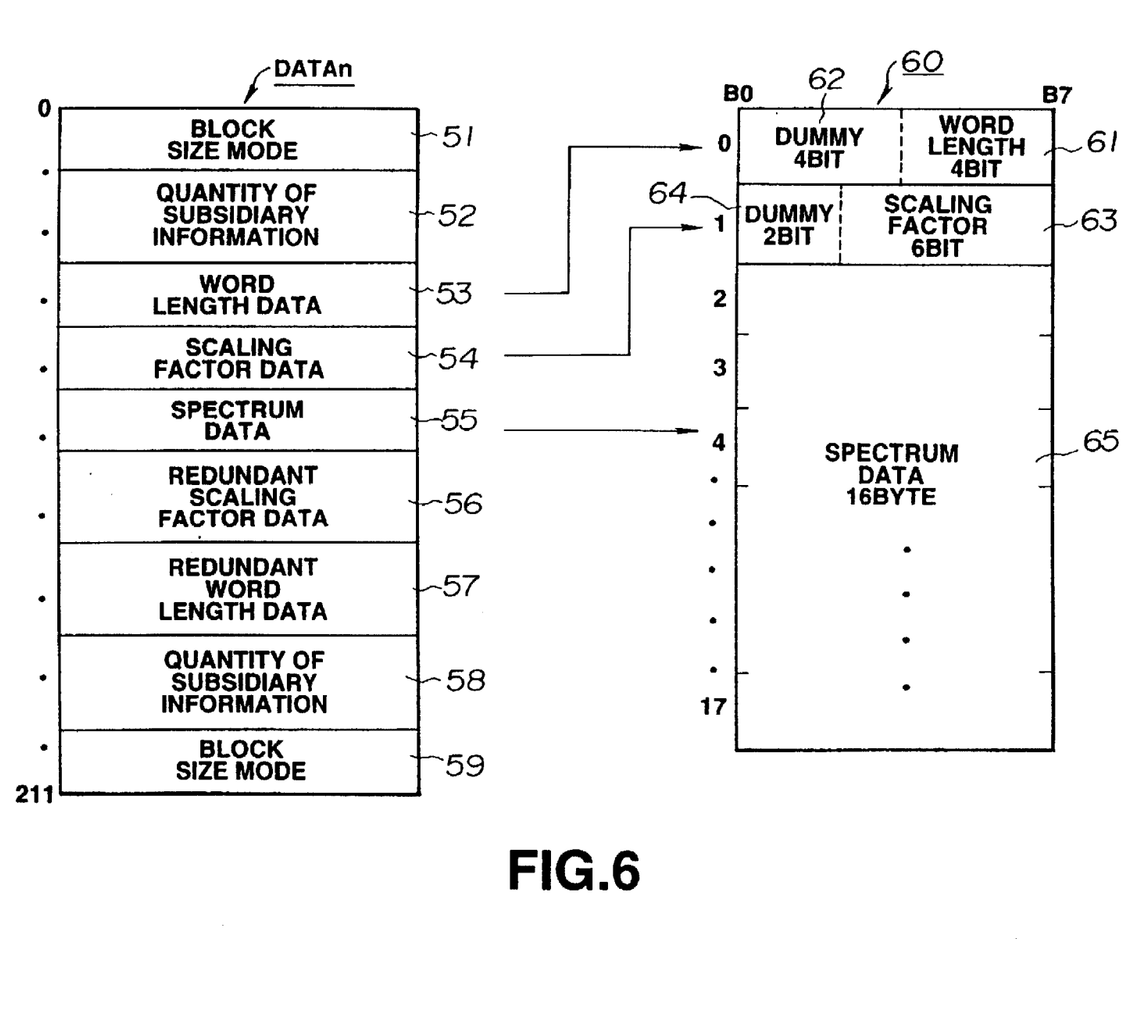
FIG. 6 illustrates decoded data to which the redundant information is appended.

The re-encoder 100 includes an editing memory 60 for generating the data freed of the redundant information, such as is shown in FIG. 6.

That is, the block size mode recorded in the block size mode recording area 51 for the encoded data Datan need not be recorded because the encoded data Datan from the encoder Cn is of the long mode.

As for the subsidiary information quantity recording area 52, the code "000" reducing the bandwidth to the maximum extent is selected for the amount 1, that is the quantity of the subsidiary information recorded in the subsidiary information quantity recording area 52, due to bandwidth limitation of the encoded data Datan. The amounts 2 and 3 are deemed to be "00" and "000" because the recorded portions in duplicate are removed as being redundant. The quantity of the subsidiary information need not be recorded since it can be of a fixed value.

Of the word length data recorded in the word length data recording area 53, only the word length data corresponding to the first unit UNIT0 become valid. Therefore, only the 4-bit word length data 61 corresponding to the first unit UNIT0 is recorded in the editing memory 60. However, in view of convenience in processing by hardware, a 1-byte data, produced on appending a 4-bit dummy 62 (=0000) to the above-mentioned 4-bit word length data 61, is recorded in the editing memory 60.

Of the scaling factor data recorded in the scaling factor recording area 54, only the 6-bit scaling factor data 63 corresponding to the first unit UNIT0 is recorded, as in the case of the word length data 61. In such case, in view of convenience in processing by hardware, a 1-byte data, produced on appending a 2-bit dummy 64 to the above-mentioned 6-bit scaling factor data 63, is similarly recorded in the editing memory As for the spectral data recording area 55, the spectral data recorded in the spectral data recording area 55 may be found from the word length data recorded in the spectral data recording area 55. However, since the processing operation for finding the spectral data is rather complicated, and the quantity of data extracted by the present processing is variable depending on the word length data, the maximum value of the word length data is deemed to be one word (=16 bits) and 16 bytes as counted from the leading end is extracted from the spectral data recording area 55 so as to be recorded in the editing memory 60. The number of spectral data included in the first unit UNIT0 is 8. Although unnecessary spectral data is recorded by the processing operation, there is no particular problem raised because the unnecessary spectral data is decoded during decoding by the word length data 61.

Thus the data edited in the editing memory after being freed of the unnecessary portion as described above is of 18 bytes in total, as shown in FIG. 6. That is, data compression by about 1/12 is achieved as compared to the 212 bytes of the encoded data Datan generated in the encoder Cn.

Thus the unnecessary information resulting from the bandwidth limitation is now freed of the encoded data Datan from the encoder Cn. The encoded data Datan, freed of the redundant or unnecessary information, is now outputted by the re-encoder 100 to the formatter 101 as the re-encoded data DataR.

The formatter 101 shown in FIG. 3 is now explained.

The formatter 101 is fed from the re-encoder 100 with the re-encoded data DataR generated by the editing memory 60, from one sound frame to another, as shown in FIG. 6, while being fed from the encoders C1 to C(n−1) with the encoded data Data1 to Data(n−1) generated in accordance with the format of data 50 shown in FIG. 5.

The formatter 101 builds the encoded data Data1 to Data(n−1) and the encoded data DataR into a bitstream for transmission or recording on a recording medium, in accordance with a pres-set format, and outputs the data as the bitstream.

That is, the formatter 101 plays the role of a multiplexor for combining the encoded data Data1 to Data(n−1) and the encoded data DataR into one bitstream.

The operation of the above-described high efficiency encoding device, shown in FIG. 3, is hereinafter explained.

The multi-channel audio signals Ch1 to Chn, inclusive of the bandwidth-limited audio signals Chn, are respectively fed via input terminals A1 to An, associated with the respective channels, to the quantizers B1 to Bn, similarly associated with the respective channels.

The audio signals Ch1 to Chn, entering the quantizers B1 to Bn via the input terminals A1 to An, are sampled and quantized by the quantizers B1 to Bn. The sampled and quantized audio data Ch1 to Chn are fed to the encoders C1 to Cn associated with the respective channels.

The audio data Ch1 to Chn from the quantizers B1 to Bn are encoded by the encoders C1 to Cn by the same encoding technique. The encoders C1 to C(n−1) route the encoded audio signals Ch1 to Ch(n−1) as encoded data Data1 to Data(n−1) to the formatter 101, while the encoder Cn, associated with the bandwidth-limited audio signal Chn, routes the encoded audio data Chn as encoded data Datan to the re-encoder 100.

The re-encoder 100 eliminates the redundant information resulting from bandwidth limitation from the encoded data Datan from the encoder Cn and routes the re-encoded data Datan as re-encoded data DataR to the formatter 101.

The formatter 101 combines the encoded data Data1 to Data(n−1) from the encoders C1 to C(n−1) and the re-encoded data DataR from the re-encoder 100 in accordance with a pre-set format into a bitstream which is outputted at an output terminal 102.

The high efficiency encoding apparatus encodes the multi-channel audio data Ch1 to Chn inclusive of the bandwidth-limited audio data Chn by the same encoding technique. The bandwidth-limited audio signals Chn, encoded by the encoder Cn, is freed of the redundant information resulting from the bandwidth limitation by the re-encoder 100. Thus it becomes possible to effect encoding with a higher efficiency and corresponding bit rate reduction by employing the re-encoder 100 by utilizing a conventional high efficiency encoding apparatus, such as by utilizing the re-encoder 100 shown in FIG. 3, without the necessity of developing the high-efficiency encoding apparatus dedicated to the bandwidth-limited audio signals.

The method and apparatus for high efficiency decoding according to the present invention are hereinafter explained.

Figure 7:
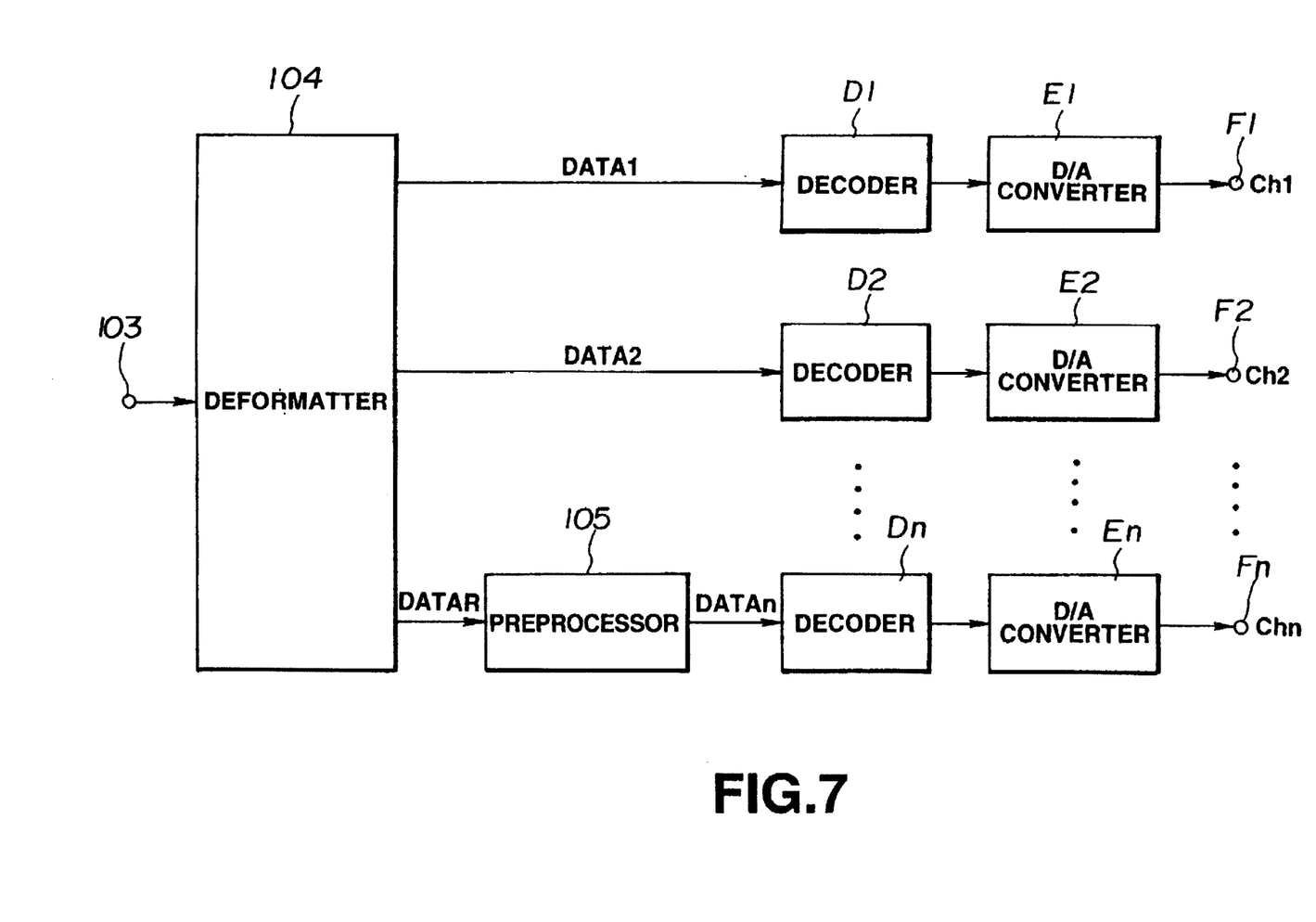
FIG. 7 is a schematic plan view showing the constitution of a motion picture film.

The high efficiency decoding method according to the present invention is executed by the high efficiency decoding apparatus shown in FIG. 7.

Referring to FIG. 7, the high efficiency decoding apparatus includes an input terminal 103 fed with encoded data (bitstream) resulting from encoding of the multi-channel audio signals Ch1 to Chn, inclusive of the bandwidth-limited audio signals Chn, with the same encoding technique and also resulting from elimination from the bandwidth-limited audio data of the redundant information resulting from the bandwidth limitation. The deformatter 104 resolves the bitstream, entering the input terminal 103, into the channel-based encoded data Data1 to Data(n−1) and the encoded data DataR freed of the redundant information resulting from the bandwidth limitation, in accordance with a pre-set format. The pre-processor 105 appends the eliminated redundant information to the re-encoded data DataR from the deformatter 104. The decoding means D1 to Dn decode, by the same decoding technique, the encoded multi-channel data Data1 to Datan inclusive of the encoded data Datan which is the encoded data DataR to which the redundant information has been appended by the pre-processor 105. The digital/analog (D/A) converters E1 to En convert the encoded data Data1 to Datan, decoded by the decoding means D1 to Dn, into analog signals which are outputted as audio signals Ch1 to Chn. The output terminals F1 to Fn output audio data Ch1 to Chn from the D/A converters E1 to En.

The input terminal 103 is fed with the bitstream, built by the high efficiency encoding apparatus shown in FIG. 3, through the route of transmission or a recording/reproducing system for a recording medium, not shown.

The bitstream is built up of the re-encoded data DataR and the encoded data Data1 to Data(n−1). The re-encoded data means the encoded data Datan from which the redundant information generated by the bandwidth limitation has been eliminated at the time of encoding of the bandwidth-limited audio data Chn by the high efficiency encoding apparatus. The encoded data Data1 to Datan mean the multi-channel audio data Ch1 to Chn encoded by the same encoding technique.

Thus the deformatter 104 resolves the above-mentioned bitstream into the re-encoded data DataR and the encoded data Data1 to Data(n−1) on the channel basis.

The pre-processor 105 appends the redundant information, eliminated by the encoding operation by the high efficiency encoding apparatus, to the re-encoded data dataR resolved by the deformatter 104. The pre-processor 105 outputs the re-encoded data DataR, having the redundant information appended thereto, as the encoded data Datan.

Figure 8:
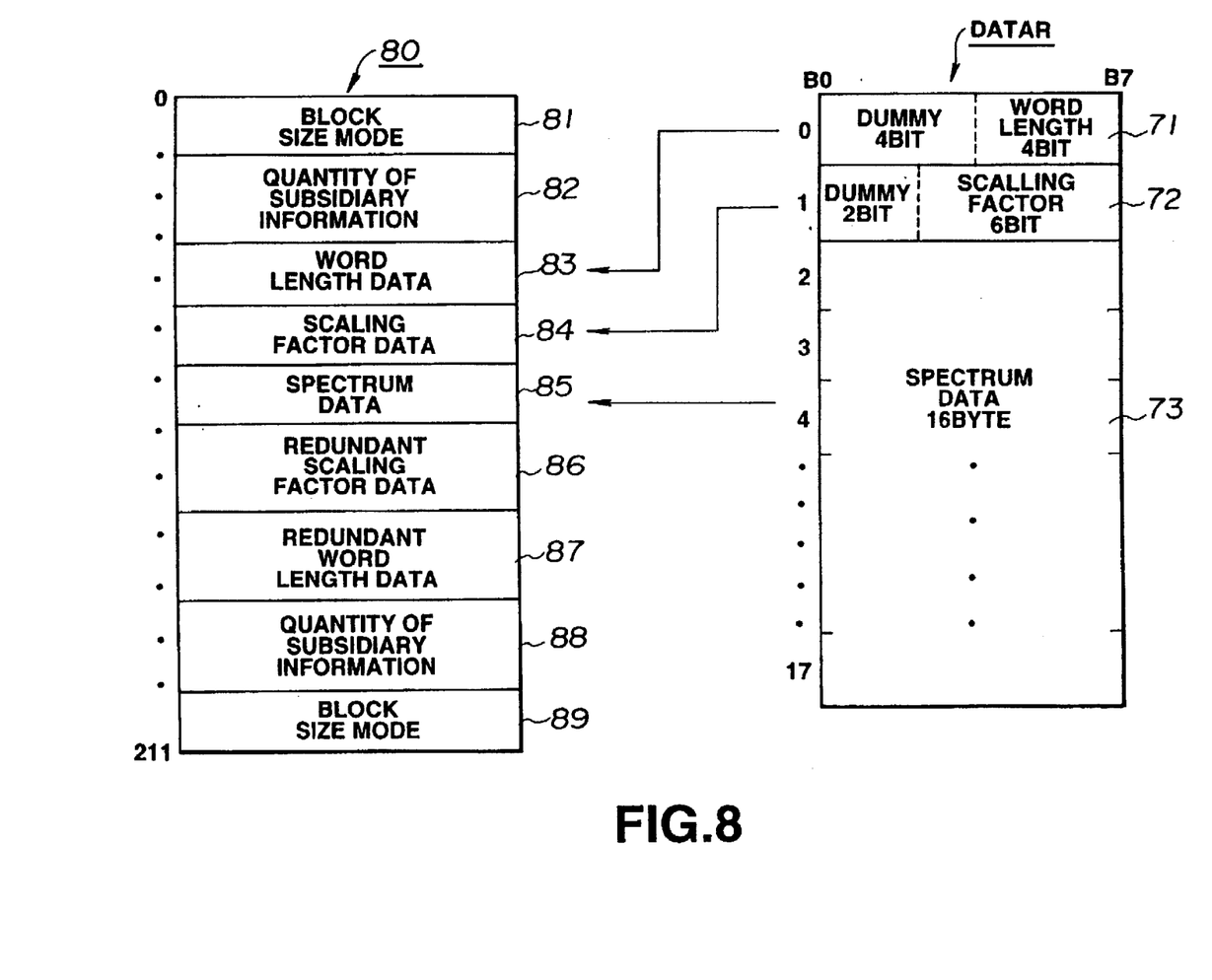
FIG. 8 is a schematic plan view showing the constitution of a 8-channel digital sound system.

The re-encoded data DataR, supplied from the deformatter 104, is 18-byte data, resulting from re-encoding by the re-encoder 100 of the high efficiency encoding apparatus of FIG. 3, as shown in FIG. 8. The redundant information eliminated by the re-encoder 100 is appended to the 18-byte re-encoded data DataR for restoring the 212-byte data shown in FIG. 5. To this end, the pre-processor 105 includes an editing memory 80 shown in FIG. 8. The editing memory 80 is previously reset to zero.

Specifically, since the values of the block floating units and the values of the subsidiary information quantity are pre-set, there is no necessity of making recording in the block size mode recording area 81, lower block size mode recording area 89, subsidiary information quantity recording area 82 or in the lower subsidiary information quantity recording area 88 in the editing memory 80.

The first unit UNIT0 is recorded in the re-encoded data DataR in the word length data recording area 83 as word length data 71. This word length data 71 is extracted and recorded.

The first unit UNIT0 is recorded in the re-encoded data DataR in the scaling factor data recording area 84 as scaling factor data 72. This scaling factor data 72 is extracted and recorded.

The first unit UNIT0 is recorded in the re-encoded data DataR in the spectrum data recording area 85 as spectrum data 72. This spectrum data 73 is extracted and recorded.

Since the redundant scaling factor data and the redundant word length data are all regarded as zero in the redundant scaling factor data recording area 86 and redundant word length data recording area 87, there is no necessity for making recording in the redundant scaling factor data recording area 86 nor in the redundant word length data recording data recording area 87.

Thus the pre-processor 105 outputs data edited at the editing memory 80 to the decoder Dn as the encoded data Datan.

By restoring the 18-byte re-encoded data DataR into the 212-byte encoded data Datan, the decoder Dn executes the decoding by the same technique as that for the encoded data Data1 to Data(n−1) associated with the remaining channels.

The decoders D1 to Dn, D/A converters E1 to En and the output terminals F1 to Fn are provided in association with the above respective channels, and process the encoded data Data1 to Datan of the associated channels. The decoding by the decoders D1 to Dn are carried out by the same means.

The operation of the above-described high-efficiency decoding apparatus is hereinafter explained.

A bitstream, resulting from encoding of the multi-channel audio data Ch1 to Chn, inclusive of the bandwidth-limited audio data Chn, by the same encoding technique, and also resulting from elimination of the redundant information from the bandwidth-limited audio data, produced by the bandwidth limitation, is fed to the input terminal 103.

The deformatter 104 resolves the bitstream entering the input terminal 103 into encoded data Data1 to Data(n−1) and re-encoded data DataR on the channel basis in accordance with the pre-set format. The deformatter 104 routes the re-encoded data DataR to the pre-processor 105, while routing the encoded data Data1 to Data(n−1) other than the re-encoded data R to the associated decoders D1 to D(n−1).

The pre-processor 105 appends the eliminated redundant information to the re-encoded data DataR from the deformatter 104 and transmits the re-encoded data DataR, now carrying the redundant information, to the decoder Dn as the re-encoded data Datan.

The decoders D1 to D(n−1) decode the re-encoded data Data1 to Datan from the deformatter 104 by the same decoding technique, while the decider Dn decodes the encoded data Datan from the pre-processor 105 by the same decoding technique. The decoded data Data1 to Datan are fed to the associated D/A converters E1 to En.

The D/A converters E1 to En convert the decoded data Data1 to Datan from the re-encoders D1 to Dn and output the converted analog signals at the output terminals F1 to Fn as the audio signals Ch1 to Chn.

Thus, with the above-described high-efficiency decoding apparatus, the encoded data of the previously described high efficiency encoding apparatus can be decoded, using e.g., the pre-processor 105 shown in FIG. 7, by utilizing the conventional high efficiency decoding apparatus, without the necessity of developing high-efficiency decoding apparatus dedicated to the bandwidth-limited audio signals.

What is claimed is:

1. A high-efficiency encoding method for encoding multi-channel signals including at least one channel of bandwidth-limited signals using the same encoding technique for each channel, comprising the steps of:

encoding the multi-channel signals including said at least one channel of bandwidth-limited signals using the same encoding technique for each channel; and compressing said encoded at least one channel of bandwidth-limited signals to reduce unnecessary information generated as a result of encoding said at least one channel of bandwidth-limited signals by using the same encoding technique as signals in other channels of said multi-channel signals to thereby obviate the use of a different encoding technique to encode said at least one channel of bandwidth-limited signals with high-efficiency.

2. The method as claimed in claim 1 wherein the multi-channel signals are audio signals and wherein the bandwidth-limited signals are low-frequency audio signals.

3. A high-efficiency encoding apparatus for encoding multi-channel signals including at least one-channel of bandwidth-limited signals using the same encoding technique for each channel, comprising means for encoding said multi-channel signals including said at least one channel of bandwidth-limited signals using the same encoding technique for each channel; and means for compressing said encoded at least one channel of bandwidth-limited signals to reduce unnecessary information generated as a result of encoding said at least one channel of bandwidth-limited signals by using the same encoding technique as signals in other channels of said multi-channel signals to thereby obviate the use of a different encoding technique to encode said at least one channel of bandwidth-limited signals with high-efficiency.

4. The high-efficiency encoding apparatus as claimed in claim 3, wherein the multi-channel signals are audio signals and wherein the bandwidth-limited signals are low-frequency audio signals.

5. A high-efficiency decoding method for decoding high-efficiency encoded multi-channel signals including at least one channel of bandwidth-limited signals using the same decoding technique for each channel, wherein at least one channel of bandwidth-limited signals has been further compressed to reduce unnecessary information generated as a result of encoding said at least one channel of bandwidth-limited signals by using the same encoding technique as signals in other channels of said multi-channel signals, comprising the steps of:

appending the unnecessary information to said at least one channel of bandwidth-limited signals which have been high-efficiency encoded; and decoding said at least one channel of bandwidth-limited signals with the unnecessary information appended therein by using the same decoding technique as that used for the signals in other channels of said multi-channel signals to thereby obviate the use of a different decoding technique to decode said at least one channel of bandwidth-limited signals with high-efficiency.

6. The high-efficiency decoding method as claimed in claim 5 wherein the multi-channel signals are audio signals and wherein the bandwidth-limited signals are low-frequency audio signals.

7. A high-efficiency decoding apparatus for decoding high-efficiency encoded multi-channel signals including at least one channel of bandwidth-limited signals using the same decoding technique for each channel, wherein at least one channel of bandwidth-limited signals has been further compressed to reduce unnecessary redundant information generated as a result of encoding said at least one channel of bandwidth-limited signals by using the same encoding technique as signals in other channels of said multi-channel signals, comprising means for appending the unnecessary information to said at least one channel of bandwidth-limited signals which have been high-efficiency encoded; and means for decoding said at least one channel of bandwidth-limited signals with the unnecessary information appended therein by using the same decoding technique as that used for the signals in other channels of said multi-channel signals to thereby obviate the use of a different decoding technique to decode said at least one channel of bandwidth-limited signals with high efficiency.

8. The high-efficiency decoding apparatus as claimed in claim 7 wherein the multi-channel signals are audio signals and wherein the bandwidth-limited signals are low-frequency audio signals.

* * * * *